(12) United States Patent
Zhou et al.

(10) Patent No.: US 9,312,753 B2
(45) Date of Patent: Apr. 12, 2016

(54) POWER CONVERTER WITH LOW COMMON MODE NOISE

(71) Applicant: DELTA ELECTRONICS (SHANGHAI) CO., LTD., Pudong, Shanghai (CN)

(72) Inventors: Jinping Zhou, Shanghai (CN); Min Zhou, Shanghai (CN); Yicong Xie, Shanghia (CN)

(73) Assignee: DELTA ELECTRONICS (SHANGHAI) CO., LTD. (CN)

( * ) Notice: Subject to any disclaimer, the term of this patent is extended or adjusted under 35 U.S.C. 154(b) by 0 days.

(21) Appl. No.: 14/322,417

(22) Filed: Jul. 2, 2014

(65) Prior Publication Data

US 2015/0009727 A1    Jan. 8, 2015

Related U.S. Application Data

(63) Continuation-in-part of application No. 13/933,799, filed on Jul. 2, 2013, now abandoned.

(30) Foreign Application Priority Data

Jan. 16, 2014    (CN) .......................... 2014 1 0020818

(51) Int. Cl.
  *H02M 1/12*    (2006.01)
  *H02M 1/44*    (2007.01)
  *H02M 7/219*    (2006.01)
  *H02M 7/487*    (2007.01)
  *H02M 7/5387*   (2007.01)
(52) U.S. Cl.
  CPC ........ *H02M 1/44* (2013.01); *H02M 1/12* (2013.01); *H02M 7/219* (2013.01); *H02M 7/487* (2013.01); *H02M 7/5387* (2013.01); *H02M 2001/123* (2013.01); *Y02B 70/1441* (2013.01)

(58) Field of Classification Search
  CPC .. H02M 1/12; H02M 2001/123; H02M 1/126
  USPC ........................................ 363/44, 37
  See application file for complete search history.

(56) References Cited

U.S. PATENT DOCUMENTS

| 8,115,444 | B2* | 2/2012 | De ........................... H02P 27/08 318/801 |
| 9,030,852 | B2* | 5/2015 | Wijekoon ............. H02M 5/297 363/131 |
| 9,099,906 | B2* | 8/2015 | Tamura ................. H02M 5/458 |
| 9,099,926 | B2* | 8/2015 | Nguyen ................ H02M 7/219 |
| 2005/0073863 | A1* | 4/2005 | de Rooij ................. H02M 1/12 363/39 |

* cited by examiner

Primary Examiner — Jessica Han
Assistant Examiner — Lorena Bruner
(74) Attorney, Agent, or Firm — Hauptman Ham, LLP

(57) ABSTRACT

The present invention relates to a power converter with low common mode noise, at least comprising: a ground terminal, a power converting unit, a capacitor unit of common DC bus, a filtering capacitor unit, a filtering inductor unit, and a compensation unit. In the present invention, a filtering inductor unit including three primary windings and three auxiliary windings is used for making the power converting unit couple to three phase terminals of an external electrical apparatus. Moreover, the three auxiliary windings are further formed a compensation circuit by way of being connected with the compensation unit, such that the engineer is able to easily and effectively suppress the common mode noise occurring near the resonant frequency of the power converting apparatus through selecting a suitable turns ratio of the primary windings and the auxiliary windings.

18 Claims, 17 Drawing Sheets

POWER CONVERTER WITH LOW COMMON MODE NOISE

BACKGROUND OF THE INVENTION

1. Field of the Invention

The present invention relates to the technology field of three-phase power converters, and more particularly to a power converter with low common mode noise, which connect to a three-phase three-wire low-frequency alternating power source or a load.

2. Description of the Prior Art

Generally, three-phase power converter is applied in three-phase AC-DC systems, DC-AC systems, UPSs, wind power systems, and solar power systems for accomplishing AC-DC or DC-AC power conversion. Please refer to FIG. 1, which illustrate a diagram view of a typical topological structure of a three-phase power converter. As shown in FIG. 1, the typical three-phase power converter 1' consists of: a power converting unit 11', a filtering inductor set 12', a filtering capacitor set 13', and a line impedance stabilization network (LISN) 14', where the midpoints (A', B', C') of three arms of the power converting unit 11' are taken to be three AC terminals, and coupled to three filtering inductors ($L_{F1}'$, $L_{F2}'$, $L_{F3}'$) of the filtering inductor set 12', respectively. Moreover, the three filtering inductors ($L_{F1}'$, $L_{F2}'$, $L_{F3}'$) further coupled to three star-connected filtering capacitors $C_x'$ of the filtering capacitor set 13'. As shown in FIG. 1, one end of the three filtering capacitors $C_x'$ are coupled to three phase terminals ($U_a'$, $U_b'$, $U_c'$) of an external electrical grid 2', and the other end of the three filtering capacitors $C_x'$ are connected to a netural point on the circuit. In addition, the LISN 14' is coupled between the electrical grid 2' and the filtering capacitor set 13', and it is an auxiliary unit when tests conducted electromagnetic interference of the three-phase power converter 1'. Besides, three DC terminals (O', P', Q') which formed by three DC filtering capacitors ($C_{B0}'$, $C_{B1}'$, $C_{B2}'$) are taken as the output terminals of the power converting unit 11', wherein the DC terminal O' is the midpoint of the common DC bus, and both the DC filtering capacitor $C_{B1}'$ and the DC filtering capacitor $C_{B2}'$ connected to the DC terminal O'.

In the aforesaid three-phase power converter 1', there is a stray capacitor $C_0'$ between the ground GND' and the common DC bus which connected with the three DC filtering capacitors ($C_{B0}'$, $C_{B1}'$, $C_{B2}'$), and there are three stray capacitors ($C_{1A}'$, $C_{1B}'$, $C_{1C}'$) between the ground GND' and the midpoints (A', B', C') of each of arms of the power converting unit 11'. Therefore, when the power converting unit 11' is executed for voltage potential jumping, the distribution capacitors ($C_{1A}'$, $C_{1B}'$, $C_{1C}'$) would produce corresponding displacement currents, and then the displacement currents further flow into the ground GND', forming a common mode noise (common mode current) due to the three-phase power converter 1'.

Accordingly, an alternative three-phase power converter 1' shown by FIG. 2 is proposed for solving the common mode noise issue. As shown in FIG. 2, a common mode passive filter 15' is coupled between the electrical grid 2' and the filtering capacitor set 13', wherein the common mode passive filter 15' comprises a common mode inductor 151' and a filtering capacitor set 152' including three star-connected filtering capacitors $C_Y'$.

Although the alternative three-phase power converter 1' shown in FIG. 2 can indeed solve the common mode noise problem, it is very difficult to design and integrate the common mode inductor set 151' because of the huge volume and high cost of the common mode inductors $L_{CM}'$. FIG. 3 shows AC sweep results including curve 1, curve 2 and curve 3, wherein curve 1 represents the voltage spectrum of the three-phase power converter 1' shown by FIG. 1, and curve 2 represents the voltage spectrum of the three-phase power converter shown by FIG. 2. From FIG. 3, it can find that, in spite of disposing the common mode passive filter 15' between the electrical grid 2' and the filtering capacitor set 13' of the three-phase power converter 1', there still has a large noise occurring near the resonant frequency $f_0$ of the power converter 1'; that means the common mode passive filter 15' cannot effectively suppress the common mode noise of the three-phase power converter 1'.

Accordingly, in view of the disposing the common mode passive filter 15' cannot effective suppress the common mode noise of the three-phase power converter 1', one point is that the inventor of the present application has made great efforts to make inventive research thereon and eventually provided a power converter with low common mode noise.

SUMMARY OF THE INVENTION

The primary objective of the present invention is to provide a power converter with low common mode noise, in which a filtering inductor unit including three primary windings and three auxiliary windings is used for making the power converting unit of the power converting apparatus couple to three phase terminals of an external electrical apparatus. Moreover, the three auxiliary windings are further formed a compensation circuit by way of being connected with the compensation unit, such that the engineer is able to easily and effectively suppress the common mode noise occurring near the resonant frequency of the power converter through selecting a suitable turns ratio for the primary windings and the auxiliary windings.

Accordingly, to achieve the primary objective of the present invention, the inventor of the present invention provides a power converter with low common mode noise, comprising:

a ground terminal;

a power converting unit, including a first DC terminal, a second DC terminal, a first AC terminal, a second AC terminal, and a third AC terminal;

a capacitor unit of common DC bus, coupled to the first DC terminal and the second DC terminal;

a filtering capacitor unit, comprising a first filtering capacitor, a second filtering capacitor and a third filtering capacitor, wherein one end of the first filtering capacitor, the second filtering capacitor and the third filtering capacitor are respectively coupled to a first phase terminal, a second phase terminal and a third phase terminal, and the other end of the first filtering capacitor, the second filtering capacitor and the third filtering capacitor are coupled to each other for forming a netural terminal; and a filtering inductor unit, comprising: a first primary winding, including a first primary winding low-frequency end and a first primary winding high-frequency end, wherein the first primary winding low-frequency end is coupled to the first phase terminal and the third filtering capacitor, and the first primary winding high-frequency end being coupled to the first AC terminal; a first auxiliary winding, being coupled to the first primary winding, and including a first auxiliary winding high-frequency end and a first auxiliary winding low-frequency end coupling to the netural terminal; a second primary winding, including a second primary winding low-frequency end and a second primary winding high-frequency end, wherein the second primary winding low-frequency end is coupled to the second phase terminal and the second filtering capacitor, and the second primary winding high-frequency end being coupled to the second AC terminal; a second auxiliary winding, being coupled to the second primary winding, and including a second auxiliary winding high-frequency end and a second auxiliary winding low-frequency end coupling to the first auxiliary winding high-frequency end; a third primary winding, including a third primary winding low-frequency end and a third primary winding high-frequency end, wherein the third primary winding low-frequency end is coupled to the third phase terminal and the first filtering capacitor, and the third primary winding high-frequency end being coupled to the third AC terminal; and a third auxiliary winding, being coupled to the third primary winding, and including a third auxiliary winding low-frequency end and a third auxiliary winding high-frequency end and coupling to the ground terminal.

According to one embodiment of the power converter with low common mode noise, wherein a compensation unit is coupled between the third auxiliary winding high-frequency end and the ground terminal.

According to one embodiment of the power converter with low common mode noise, wherein a compensation unit is further coupled between the third auxiliary winding high-frequency end and the ground terminal, and the compensation unit is selected from the group including: compensation capacitor, compensation inductor, compensation resistor, and combinations of any two or more members.

According to one embodiment of the power converter with low common mode noise, the compensation unit includes a series connected compensation capacitor and compensation inductor, wherein the inductance of the compensation inductor is satisfied with the following mathematical equation: $L_{comp} < 2(M - 3L')$; in which, $L_{comp}$ means the inductance of the compensation inductor, M means a mutual inductance of the aforesaid three primary windings and the aforesaid three auxiliary windings, and L' means a inductance of the aforesaid three auxiliary windings.

According to one embodiment of the power converter with low common mode noise, wherein the inductance of the compensation inductor is also satisfied with the following mathematical equation: $L_{comp} = M - 3L'$.

According to one embodiment of the power converter with low common mode noise, wherein all the turns ratios between the first primary winding and the first auxiliary winding, the second primary winding and the second auxiliary winding as well as the third primary winding and the third auxiliary winding are ranged from 3:1.3 to 3:0.7.

According to one embodiment of the power converter with low common mode noise, wherein each of the turns ratios between the first primary winding and the first auxiliary winding, the second primary winding and the second auxiliary winding as well as the third primary winding and the third auxiliary winding is 3:1.

According to one embodiment of the power converter with low common mode noise, wherein the power converting unit is a two-level power converter, a three-level power converter, or a multi-level power converter.

According to one embodiment of the power converter with low common mode noise, wherein the first DC terminal and the second DC terminal are coupled to a first electrical apparatus.

According to one embodiment of the power converter with low common mode noise, wherein the first electrical apparatus is an electrical grid, a motor or an energy-storing unit.

According to one embodiment of the power converter with low common mode noise, wherein a second power converting unit is coupled between the first electrical apparatus and the first DC terminal as well as the second DC terminal.

According to one embodiment of the power converter with low common mode noise, wherein the second power converting unit is an AC-DC rectifier or a DC-AC inverter.

According to one embodiment of the power converter with low common mode noise, wherein the first phase terminal, the second phase terminal and the third phase terminal are coupled to a second electrical apparatus, and the second electrical apparatus is an electrical grid or a motor.

According to one embodiment of the power converter with low common mode noise, wherein an electromagnetic interference (EMI) filter is coupled between the filtering capacitor unit and the first phase terminal, the second phase terminal as well as the third phase terminal.

According to one embodiment of the power converter with low common mode noise, wherein the electromagnetic interference (EMI) filter comprises: first EMI filter inductor, coupling between the first phase terminal and the first filtering capacitor; a second EMI filter inductor, coupling between the second phase terminal and the second filtering capacitor; a third EMI filter inductor, coupling between the third phase terminal and the third filtering capacitor; a first EMI filter capacitor, coupling between the first EMI filter inductor and the second EMI filter inductor; a second EMI filter capacitor, coupling between the second EMI filter inductor and the third EMI filter inductor; and a third EMI filter capacitor, coupling between the first EMI filter inductor and the third EMI filter inductor.

According to one embodiment of the power converter with low common mode noise, wherein the electromagnetic interference (EMI) filter comprises: a first EMI filter inductor, coupling between the first phase terminal and the first filtering capacitor; a second EMI filter inductor, coupling between the second phase terminal and the second filtering capacitor; a third EMI filter inductor, coupling between the third phase terminal and the third filtering capacitor; a first EMI filter capacitor, coupling between the third EMI filter inductor and the ground terminal; a second EMI filter capacitor, coupling between the second EMI filter inductor and the ground terminal; and a third EMI filter capacitor, coupling between the first EMI filter inductor and the ground terminal.

According to one embodiment of the power converter with low common mode noise, wherein the power converting apparatus is a three-phase three-wire power converting apparatus.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a power converter with low common mode noise according to the present invention, embodiments of the present invention will be described in detail with reference to the attached drawings hereinafter.

Figure 4:
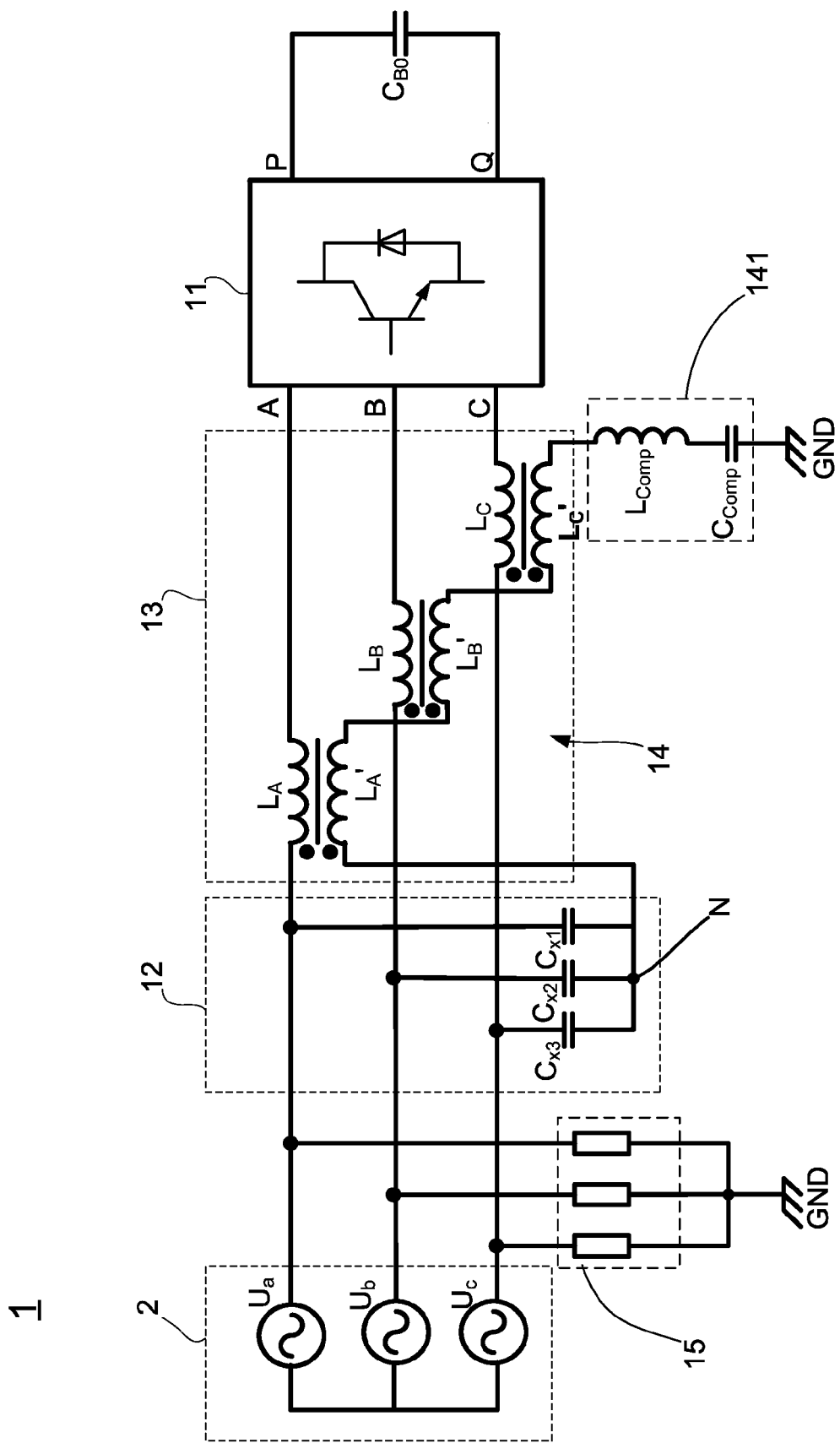
FIG. 4 shows a diagram of a power converter with low common mode noise according to the present invention.
Figure 5:
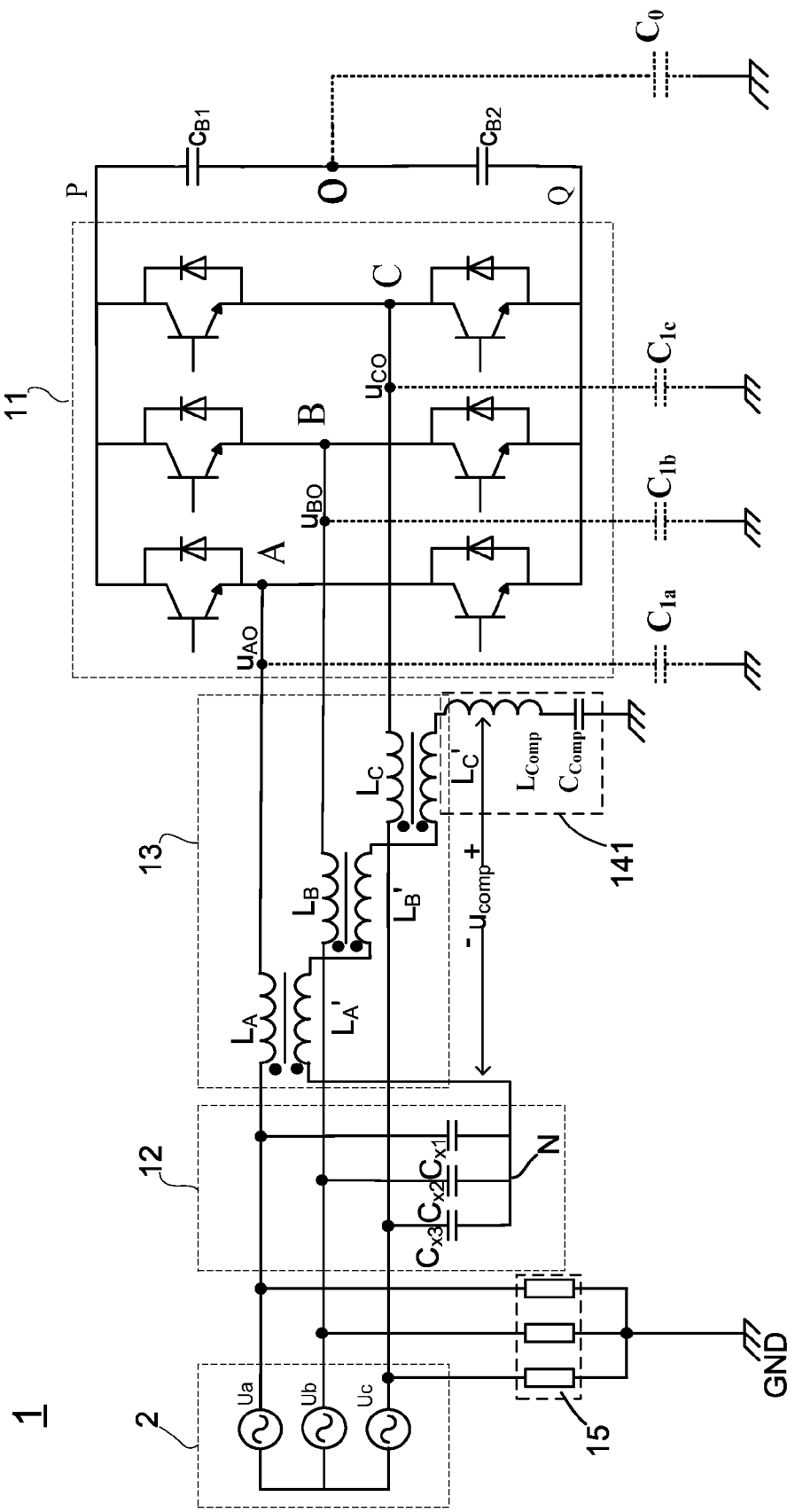
FIG. 5 shows a diagram of the power converter with low common mode noise according to the present invention.

With reference to FIG. 4 and FIG. 5, which illustrate a diagram of a power converter with low common mode noise according to the present invention respectively. As shown in FIG. 4, the power converting apparatus 1 with common mode noise suppressing function (abbreviated to "power converting apparatus" hereinafter) mainly consists of: a ground terminal GND, a power converting unit 11, a capacitor unit of common DC bus $C_{B0}$, a filtering capacitor unit 12, a filtering inductor unit 13, and a compensation circuit 14. As shown in FIG. 5, the power converting unit 11 is a two-level three-phase power converter including a first DC terminal P, a second DC terminal Q, a first AC terminal A, a second AC terminal B, and a third AC terminal C. For the first DC terminal P and the second DC terminal Q does not be connected to any other external electrical apparatus, the capacitor unit of common DC bus $C_{B0}$ is connected between the first DC terminal P and the second DC terminal Q. However, in other possible applications, the power converting unit 11 may be coupled to a capacitor, a DC-AC inverter unit, or a battery through the first DC terminal P and the second DC terminal Q thereof.

Figure 6:
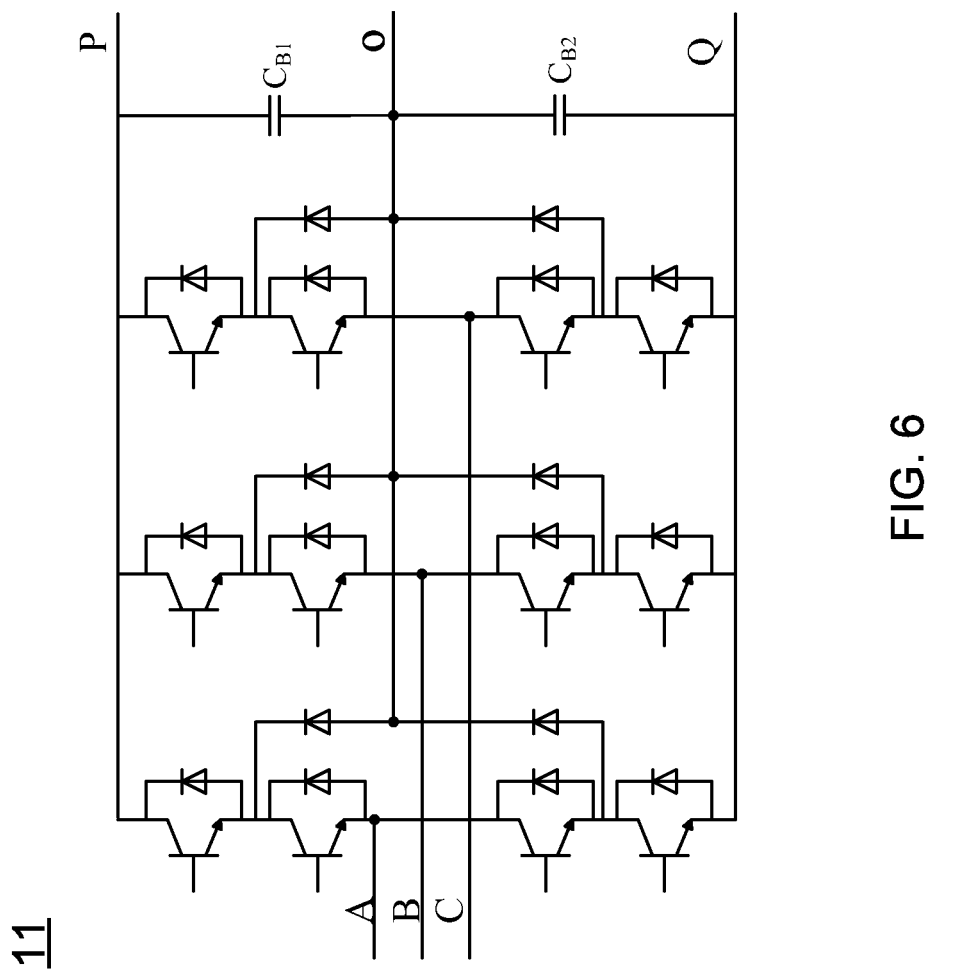
FIG. 6 shows a diagram of a power converting unit in the power converter with low common mode noise.

Referring to FIG. 5 again, and please simultaneously refer to the diagram of the power converting unit 11 shown by FIG. 6. Although the power converting unit 11 shown in FIG. 6 is a three-level power converting unit with a first DC bus capacitor $C_{B1}$ and second DC bus capacitor $C_{B2}$ divided from the capacitor unit of common DC bus $C_{B0}$, that does not used for limiting the embodiments of the power converting unit 11. In practical applications, the power converting unit 11 can also be a multi-level three-phase power converting unit or other multi-level power converting unit. As shown in FIG. 6, the first DC bus capacitor $C_{B1}$ is coupled between the first DC terminal P and the midpoint O of the DC common bus of the power converting unit 11, and the second DC bus capacitor $C_{B2}$ is coupled between the second DC terminal Q and the midpoint O.

In the power converting apparatus 1 of the present invention, the filtering capacitor unit 12 comprises a first filtering capacitor $C_{X1}$, a second filtering capacitor $C_{X2}$ and a third filtering capacitor $C_{X3}$. As shown in FIG. 5, one end of the first filtering capacitor $C_{X1}$, the second filtering capacitor $C_{X2}$ and the third filtering capacitor $C_{X3}$ are coupled to an external electrical apparatus 2, which is a three-phase electrical apparatus 2 such as electrical grid, motor and nonlinear load. Therefore, one end of the first filtering capacitor $C_{X1}$, the second filtering capacitor $C_{X2}$ and the third filtering capacitor $C_{X3}$ are coupled to a first phase terminal Ua, a second phase terminal Ub and a third phase terminal Uc of the electrical apparatus 2, respectively; in addition, the other end of first filtering capacitor $C_{X1}$, the second filtering capacitor $C_{X2}$ and the third filtering capacitor $C_{X3}$ are coupled to each other for forming a netural terminal N. Moreover, an LISN (Line Impedance Stabilization Network) 15 is coupled between the electrical apparatus 2 and the filtering capacitor unit 12 for being an auxiliary unit as the power converting apparatus 1 is treated with an electromagnetic interference test.

As shown in FIG. 5, the filtering inductor unit 13 comprises: a first primary winding $L_A$, a first auxiliary winding $L_A'$, a second primary winding $L_B$, a second auxiliary winding $L_B'$, a third primary winding $L_C$, and a third auxiliary winding $L_C'$, wherein the first primary winding $L_A$ has a low-frequency end coupling to the first phase terminal Ua of the electrical apparatus 2 and a high-frequency end coupling to the first AC terminal A of the power converting unit 11. Similarly to the first primary winding $L_A$, the first auxiliary winding $L_A'$ also includes a low-frequency end and a high-frequency end, wherein the low-frequency end and the high-frequency end of the first auxiliary winding $L_A'$ are defined to a dotted end with the low-frequency end and the high-frequency end of the first primary winding $L_A$, respectively. As shown in FIG. 5, the end marked with dot is the dotted end of the first primary winding $L_A$ and the first auxiliary winding $L_A'$, i.e., the low-frequency end. The low-frequency end of the first auxiliary winding $L_A'$ is coupled to the netural terminal N, and another end of the first auxiliary winding $L_A'$ is the high-frequency end thereof. Moreover, the second primary winding $L_B$ has a low-frequency end coupling to the second phase terminal Ub of the electrical apparatus 2 and a high-frequency end coupling to the second AC terminal B of the power converting unit 11. Similarly to the second primary winding $L_B$, the second auxiliary winding $L_B'$ also includes a low-frequency end and a high-frequency end. As shown in FIG. 5, the end marked with dot is the dotted end of the second primary winding $L_B$ and the second auxiliary winding $L_B'$, and that means the dotted of the second auxiliary winding $L_B'$ is the low-frequency end thereof; oppositely, the another end of the second auxiliary winding $L_B'$ is its high-frequency. Furthermore, the third primary winding $L_C$ has a low-frequency end coupling to the third phase terminal Uc of the electrical apparatus 2 and a high-frequency end coupling to the third AC terminal C of the power converting unit 11. Similarly to the third primary winding $L_C$, the third auxiliary winding $L_C'$ also includes a low-frequency end and a high-frequency end. As shown in FIG. 5, the end marked with dot is the dotted end of the third primary winding $L_C$ and the third auxiliary winding $L_C'$, wherein the dotted of the third auxiliary winding $L_C'$ is the low-frequency end thereof; oppositely, the another end of the third auxiliary winding $L_C'$ is its high-frequency.

In the present invention, the compensation circuit 14 consists of the first auxiliary winding $L_A'$, the second auxiliary winding $L_B'$, the third auxiliary winding $L_C'$, and a compensation unit 141, wherein the three auxiliary windings are serially connected to each other by way of connecting its own head low-frequency end with others own tail high-frequency end, so as to form a compensation branch circuit with one high-frequency terminal and one low-frequency terminal.

Figure 7:
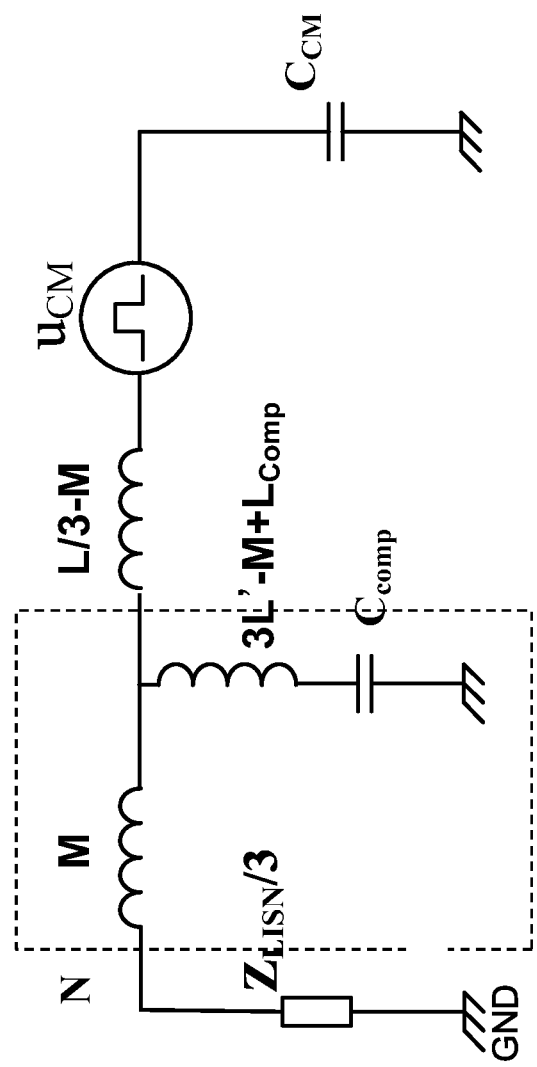
FIG. 7 shows an equivalent common mode noise model diagram of the diagram shown in FIG. 5.

Thus, as shown in FIG. 5, the low-frequency terminal of the compensation branch circuit is coupled to the netural terminal N of the filtering capacitor unit 12, and low-frequency terminal of the compensation branch circuit is coupled to the ground terminal GND. In the present invention, the embodiment of the compensation unit 14 does not be particularly limited, but the compensation unit 14 can be a compensation capacitor $C_{comp}$, a compensation inductor $L_{comp}$, a compensation resistor, or combinations of any two or more members. Please simultaneously refer to FIG. 5 and FIG. 7, wherein FIG. 7 shows an equivalent common mode noise model diagram of the diagram shown in FIG. 5. Because the compensation unit 141 shown in FIG. 5 is established by serially connecting a compensation inductor $L_{comp}$ with a compensation capacitor $C_{comp}$, the diagram of FIG. 5 can be simplified to the equivalent common mode noise model of FIG. 7. In FIG. 7, $Z_{LISN}$ is an equivalent resister (impedance) of the LISN 15 in FIG. 5, N is the netural terminal, M is a mutual inductance of the aforesaid three primary windings ($L_A$, $L_B$, $L_C$) and the aforesaid three auxiliary windings ($L_A'$, $L_B'$, $L_C'$), L is a inductance of the aforesaid three primary windings ($L_A$, $L_B$, $L_C$), and L' is a inductance of the aforesaid three auxiliary windings ($L_A'$, $L_B'$, $L_C'$).

Referring to FIG. 5 and FIG. 7 again, the $u_{AO}$, $u_{BO}$ and $u_{CO}$ in FIG. 5 are the voltages between the first AC terminal A and the midpoint O of common DC bus, the second AC terminal B and the midpoint O as well as the third AC terminal C and the midpoint O, respectively. In addition, $u_{comp}$ means a compensation voltage formed by the three auxiliary windings ($L_A'$, $L_B'$, $L_C'$) of the filtering inductor unit 13. Moreover, $C_{1a}$, $C_{1b}$ and $C_{1c}$ in FIG. 5 are respectively three stray capacitors between the first AC terminal A and the ground terminal GND, the second AC terminal B and the ground terminal GND as well as the third AC terminal C and the ground terminal GND, and Co is a stray capacitor between the midpoint O and the ground terminal GND. When the power converting apparatus 1 is executed for voltage switching, the jumping voltages ($u_{AO}$, $u_{BO}$ and $u_{CO}$) would respectively produce displacement currents in the stray capacitors ($C_{1a}$, $C_{1b}$, $C_{1c}$), and then the three displacement currents flow into the ground for forming a common mode current. Therefore, Ccm in FIG. 7 is an equivalent common mode capacitor, which is a total capacitor of the four distribution capacitors ($C_{1a}$, $C_{1b}$, $C_{1c}$, and $C_0$).

According to FIG. 7, it is able to find that the mathematical equation of $3L'-M+L_{comp}=0$ can be set up if the inductance of the compensation inductor is satisfied with the mathematical equation of $L_{comp}=M-3L'$. Therefore, the compensation circuit can be further equaled to a compensation capacitor $C_{comp}$ for being as a Y capacitor ($C_Y$), such that the Y capacitor would form an equivalent common mode filter with a common mode inductor $L_{CM}$ equaled from the mutual inductance M of the aforesaid three primary windings ($L_A$, $L_B$, $L_C$) and the aforesaid three auxiliary windings ($L_A'$, $L_B'$, $L_C'$). In practical applications, an obviously common mode filter effect can be enhanced if the inductance of the compensation inductor is satisfied with the mathematical equation of $L_{comp}<2(M-3L')$.

Figure 8:
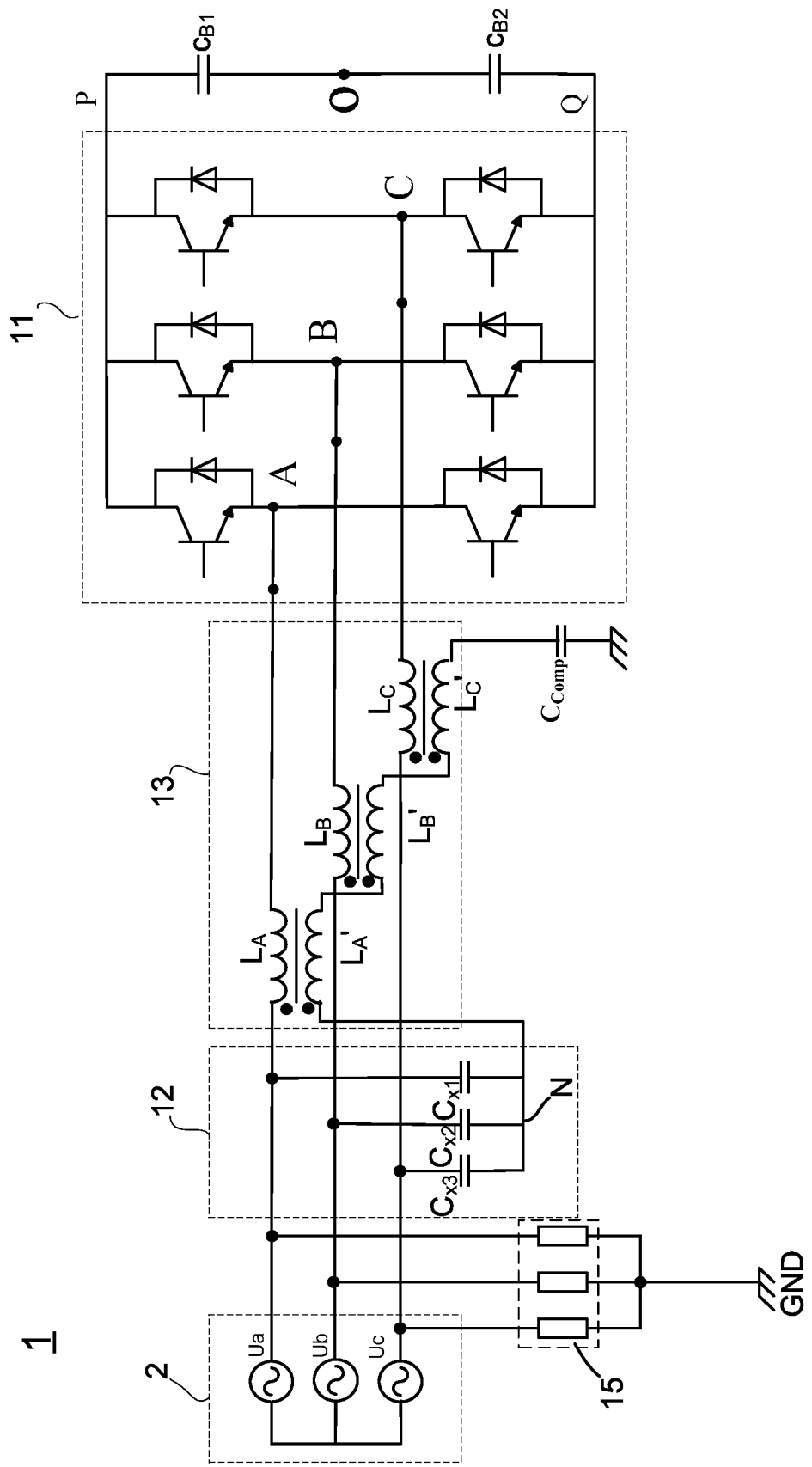
FIG. 8 shows a diagram of the power converter with low common mode noise according to the present invention.
Figure 9:
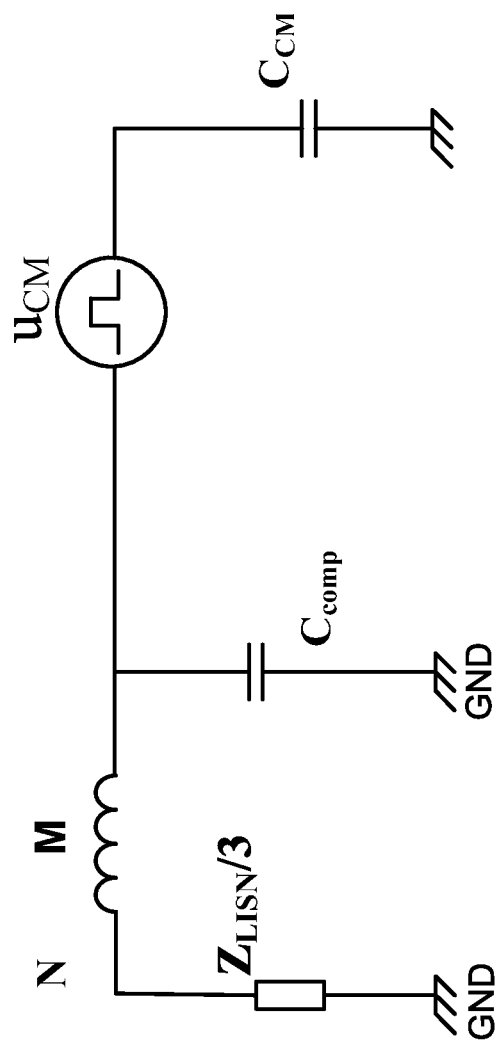
FIG. 9 shows an equivalent common mode noise model diagram of the diagram shown in FIG. 8.

Please refer to FIG. 8, which show a diagram of the power converter with low common mode noise according to the present invention. Differing from the diagram of FIG. 5, FIG. 8's circuit diagram merely uses one compensation capacitor $C_{comp}$ as the compensation unit 141. Moreover, FIG. 8's circuit diagram is simplified to the equivalent common mode noise model shown by FIG. 9. For FIG. 8's circuit diagram, each of the turns ratios between the first primary winding $L_A$ and the first auxiliary winding $L_A'$, the second primary winding $L_B$ and the second auxiliary winding $L_B'$ as well as the third primary winding $L_C$ and the third auxiliary winding $L_C'$ is 3:1, and such turns ratios make the total inductance of the three primary windings ($L_B$, $L_B$, $L_C$) and the total inductance of the three auxiliary windings ($L_B'$, $L_B'$, $L_C'$) can satisfied with the mathematical equation of L=9L', and facilitate mutual inductance M of the three primary windings ($L_B$, $L_B$, $L_C$) and the total inductance of the three auxiliary windings ($L_B'$, $L_B'$, $L_C'$) can satisfied with the mathematical equation of M=3L'. Thus, because $L_{comp}=M-3L'$, it is able to calculate and obtain the $L_{comp}=0$. Based on this result, it can know that the use of the compensation inductor is unnecessary for FIG. 8's circuit diagram.

Figure 3:
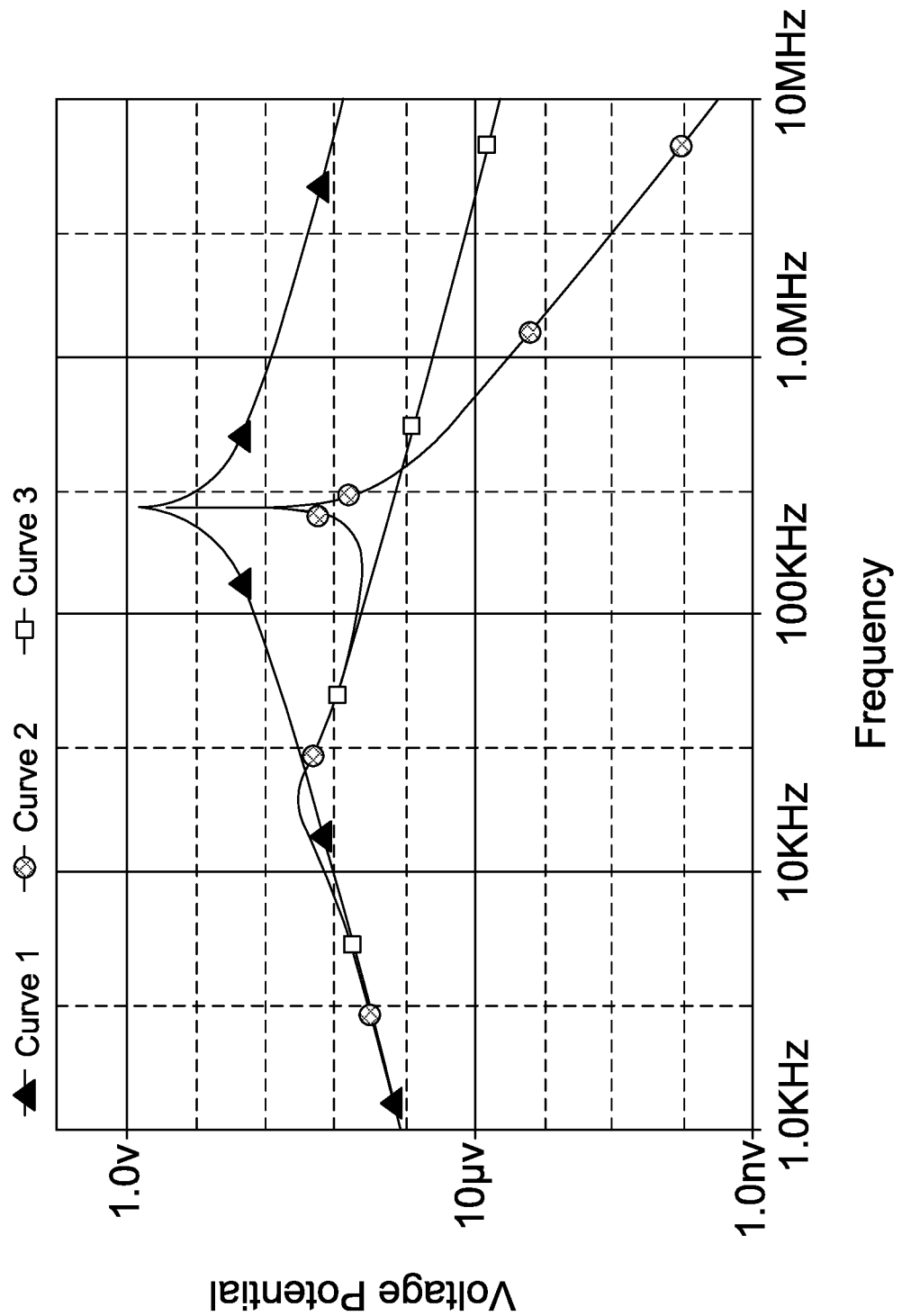
FIG. 3 shows AC sweep results.

Also, because L/3-M=0, the curve 3 plotted in FIG. 3 shows that L/3-M=0 effectively enhance the suppression on the common mode noise occurring near the resonant frequency $f_0$ of the power converting apparatus 1. Herein, it needs to further explain that, because the coupling ratio (i.e., turns ratio) between each of the primary windings ($L_B$, $L_B$, $L_C$) and the auxiliary windings ($L_B'$, $L_B'$, $L_C'$) cannot be 1, all the turns ratios between the three primary winding ($L_B$, $L_B$, $L_C$) and the three auxiliary winding ($L_B'$, $L_B'$, $L_C'$) are set between 3:1.3 and 3:0.7 in the power converting apparatus 1 proposed by the present invention; and preferably, the best turns ratio is 3:1.

Figure 1:
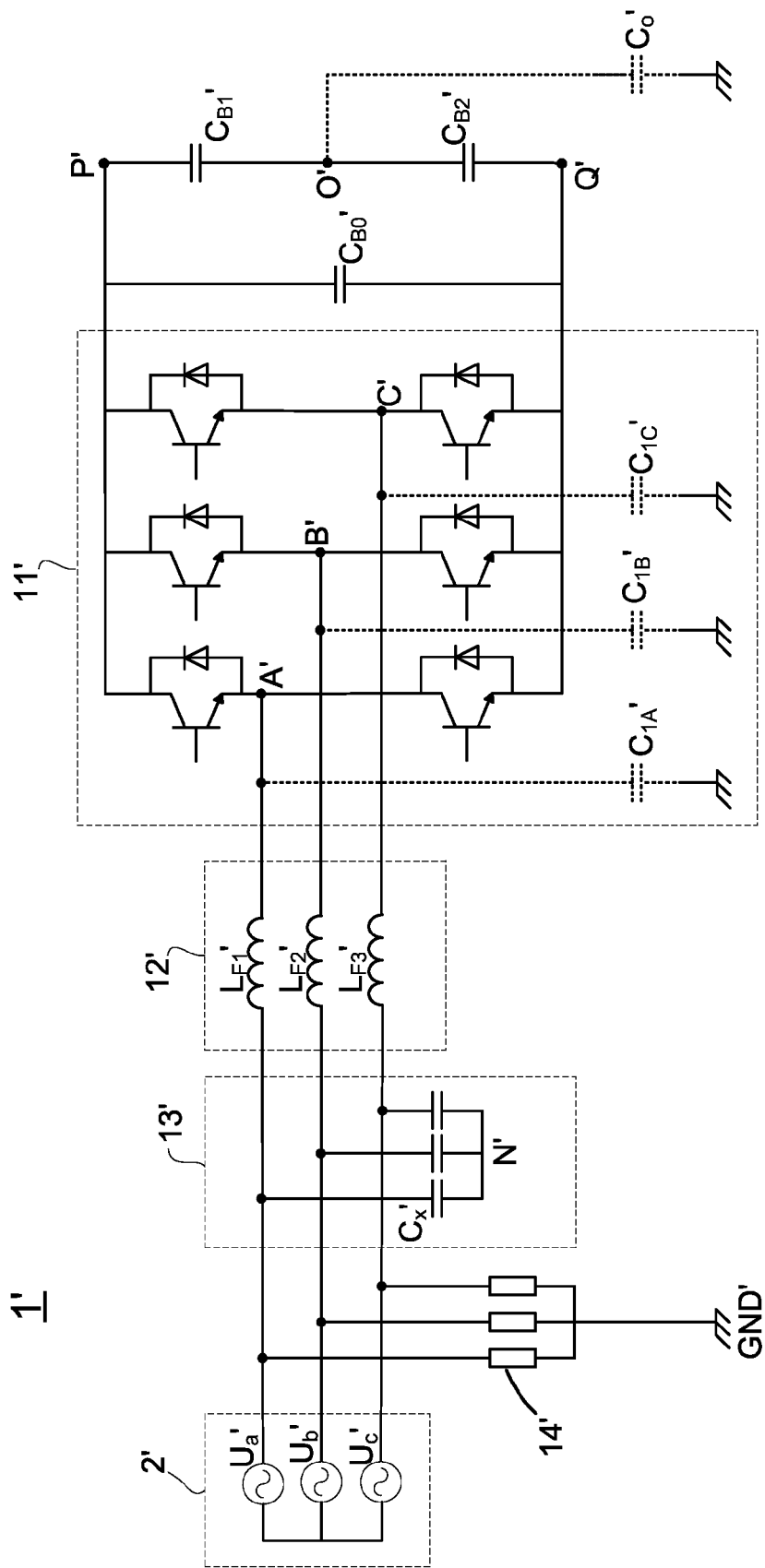
FIG. 1 shows a diagram view of a typical topological structure of a three-phase power converter.
Figure 2:
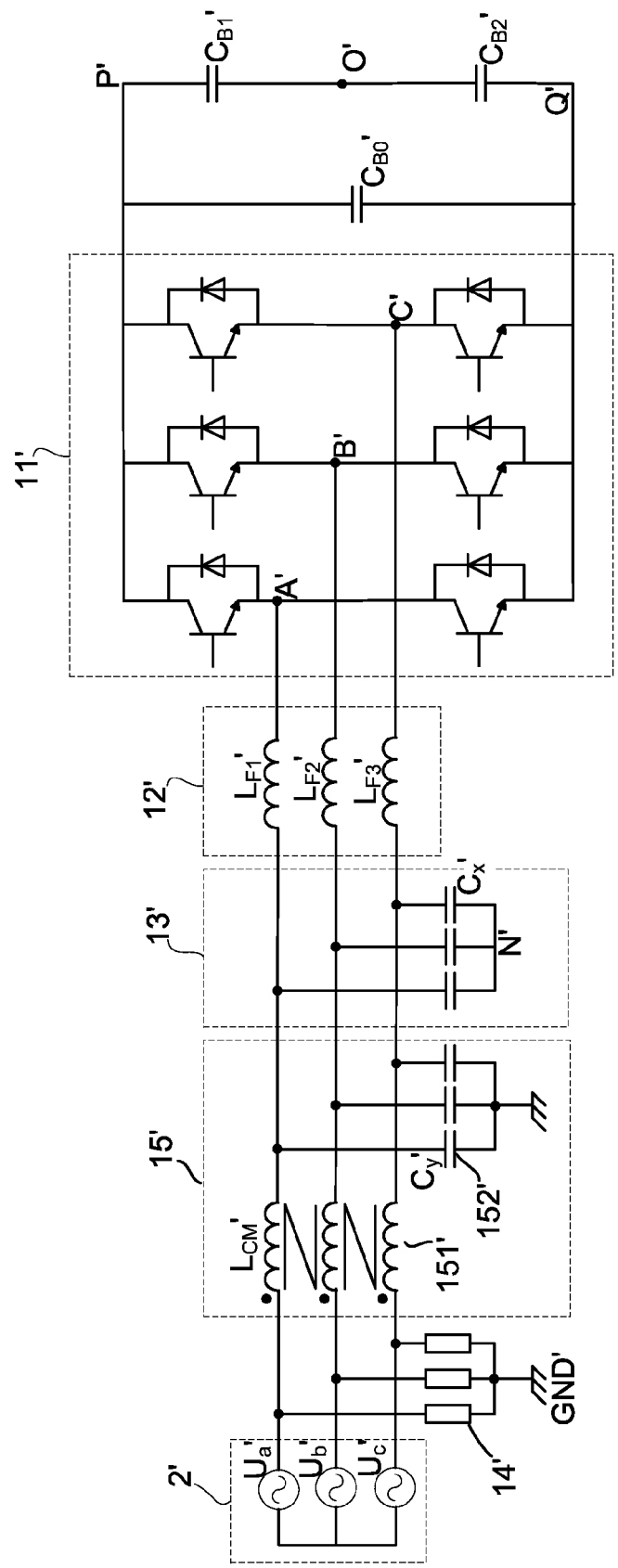
FIG. 2 shows a diagram of suppressing common mode noise of the typical three-phase power converter.
Figure 10A:
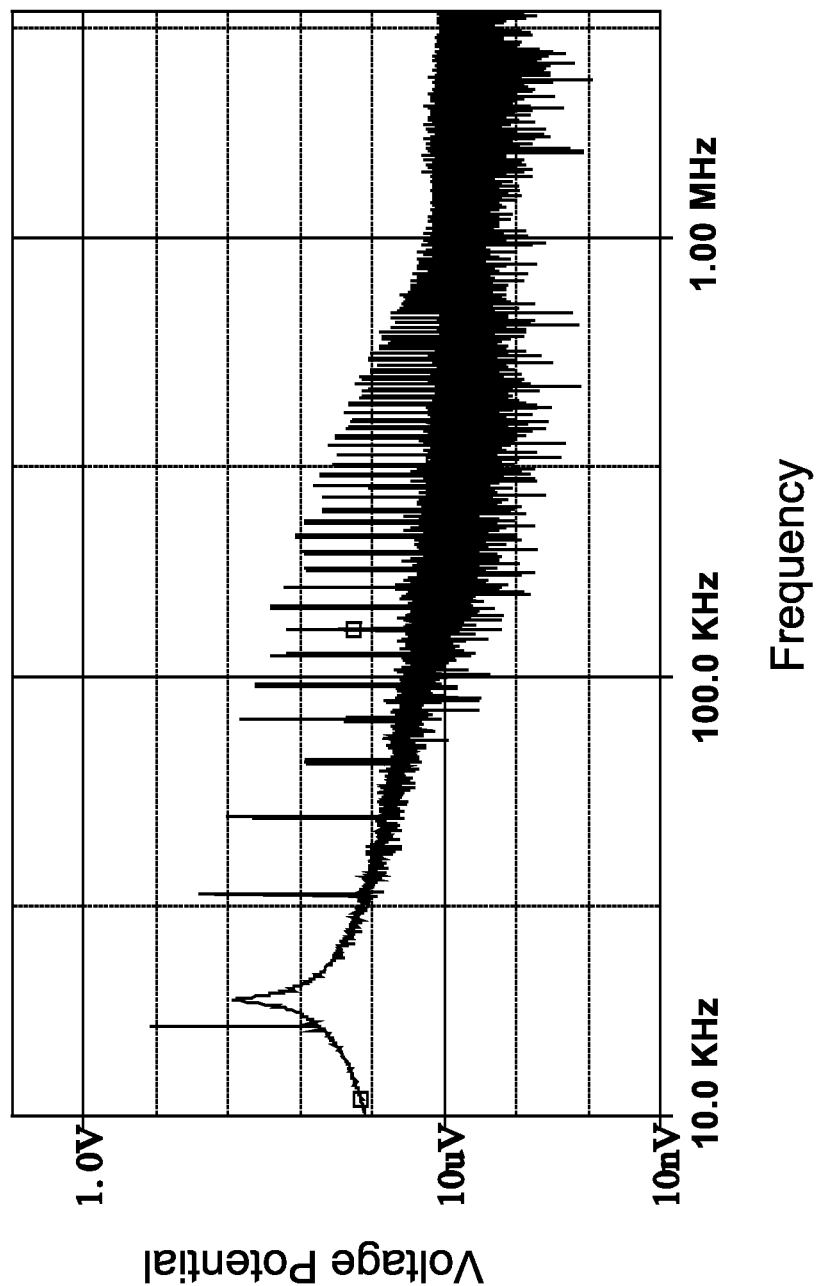
FIGS. 10A and 10B show two voltage spectrums.
Figure 10B:
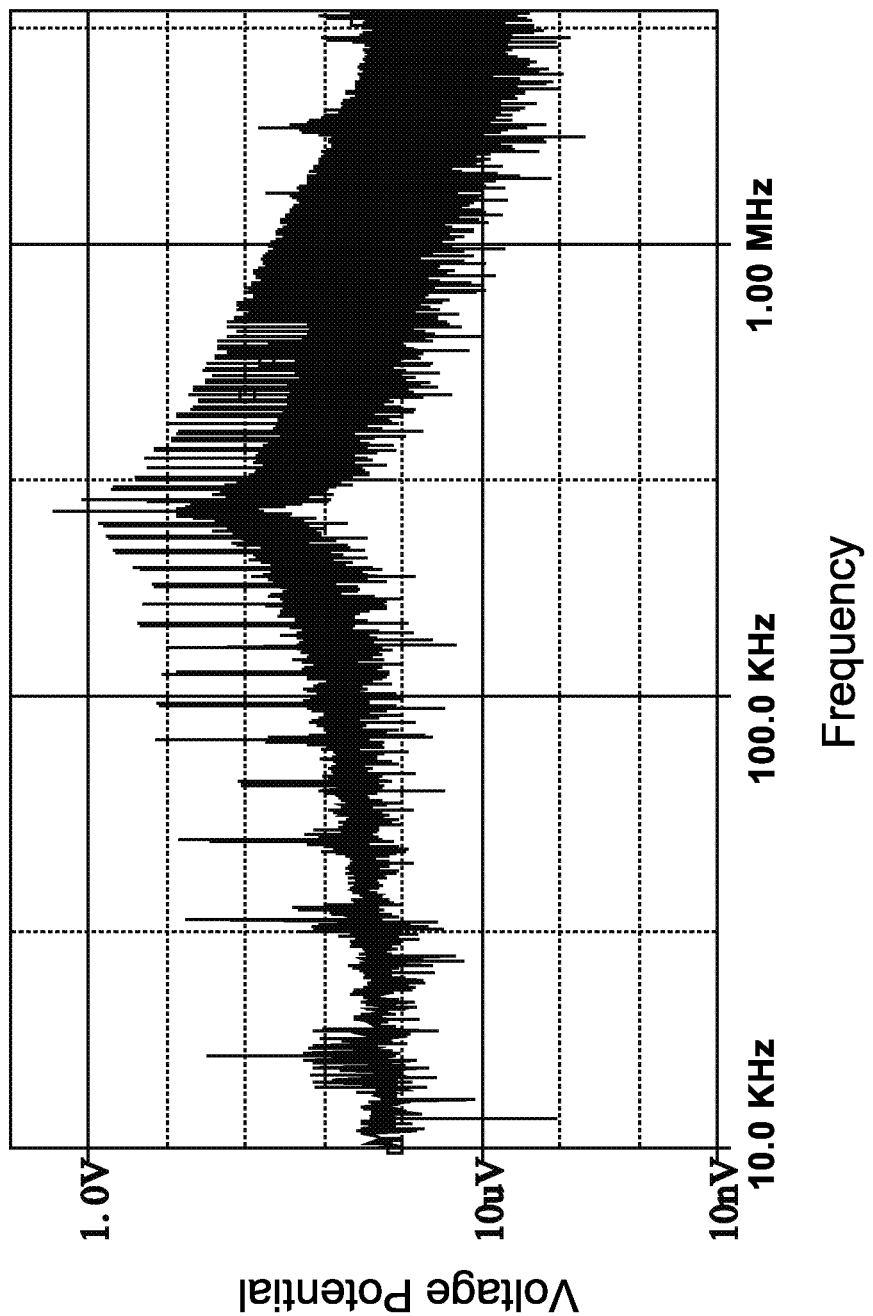

The efficiency on common mode noise suppression of the power converting apparatus 1 can be determined by treating the simulation to FIG. 8's circuit diagram and FIG. 1's circuit diagram, and measuring the voltage of their LISN 15 under different frequencies. The voltage spectrum for FIG. 8's circuit framework and FIG. 1's circuit framework are respectively shown in FIG. 10A and FIG. 10B. Comparing FIG. 10A's data curve with FIG. 10B's data curve, it can easily find that when operating above 30 kHz, FIG. 8's circuit diagram can reach better common mode noise suppressing efficiency, and when operating above 260 kHz, FIG. 8's circuit diagram can also avoids the resonance.

Figure 11:
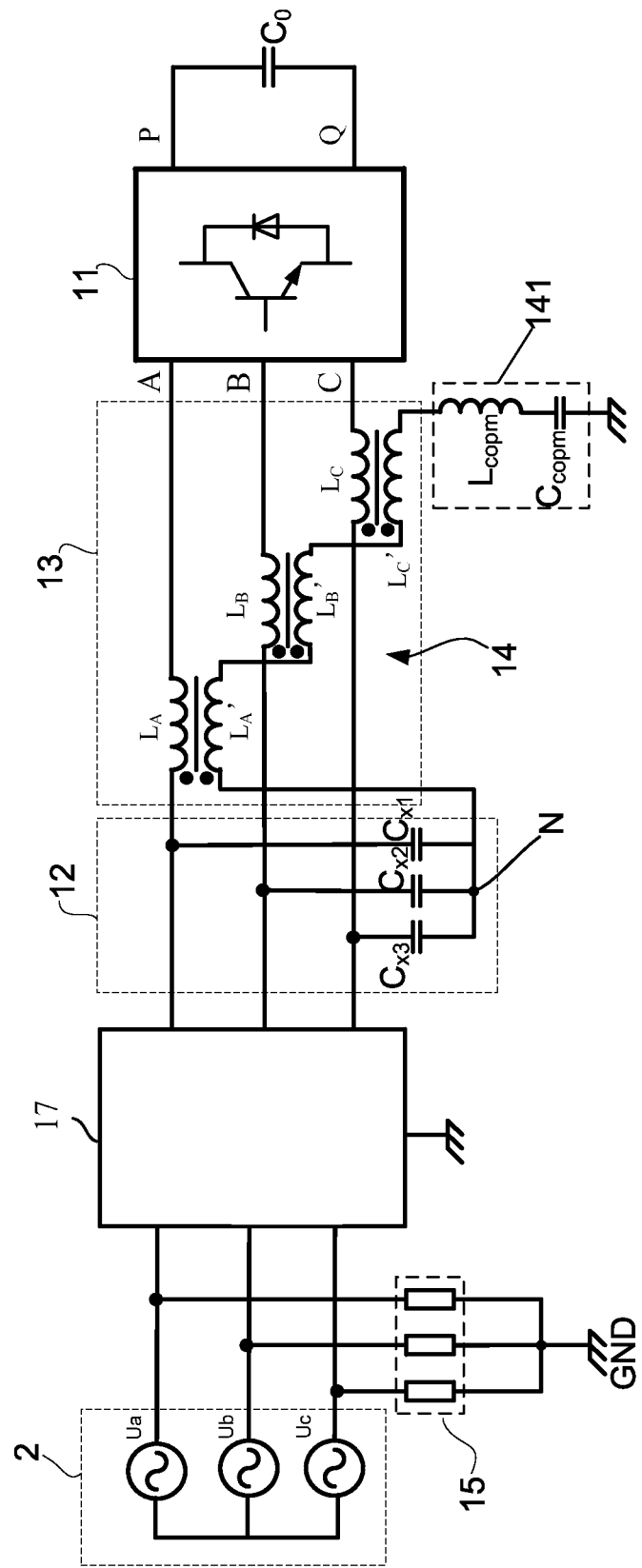
FIG. 11 shows a diagram of the power converter with low common mode noise according to the present invention.
Figure 12:
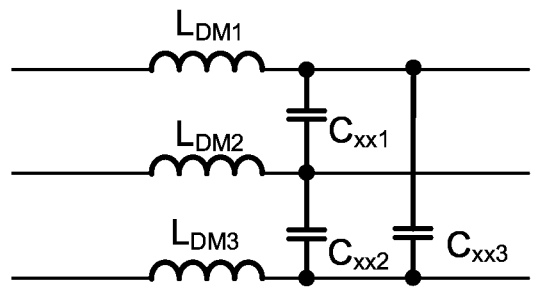
FIG. 12 shows a diagram of an electromagnetic interference (EMI) filterpower converter with low common mode noise.

Besides the circuit diagram shown in FIG. 3, FIG. 5 and FIG. 8, the power converting apparatus 1 of the present invention also includes other possible and extensive application on its circuit diagram. Referring to FIG. 11, there is shown a diagram of the power converter with low common mode noise according to the present invention. In which, the circuit diagram of the power converting apparatus 1 is established and obtained by way of connecting an electromagnetic interference (EMI) filter 17 between the filtering capacitor unit 12 and the electrical apparatus 2. The EMI filter 17 can be a differential-mode filter shown by FIG. 12 or a common-mode filter shown by FIG. 13.

Inheriting to above descriptions, the differential-mode EMI filter 17 including: a first differential-mode filtering inductor $L_{DM1}$, coupling between the first phase terminal Ua and the first filtering capacitor $C_{X1}$; a second differential-mode filtering inductor $L_{DM2}$, coupling between the second phase terminal Ub and the second filtering capacitor $C_{X2}$; a third differential-mode filtering inductor $L_{DM3}$, coupling between the third phase terminal Uc and the third filtering capacitor $C_{X3}$; a first differential-mode filtering capacitor $C_{XX1}$, coupling between the first differential-mode filtering inductor $L_{DM1}$ and the second differential-mode filtering inductor $L_{DM2}$; a second differential-mode filtering capacitor $C_{XX2}$, coupling between the second differential-mode filtering inductor $L_{DM2}$ and the third differential-mode filtering inductor $L_{DM3}$; and a third differential-mode filtering capacitor $C_{XX3}$, coupling between the first differential-mode filtering inductor $L_{DM1}$ and the third differential-mode filtering inductor $L_{DM3}$.

Figure 13:
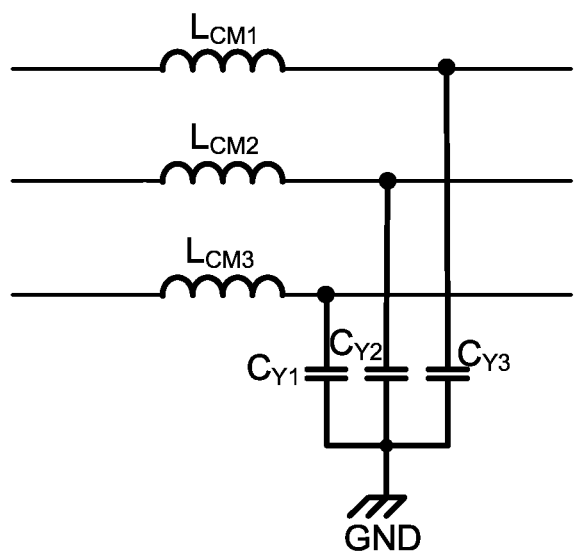
FIG. 13 shows another diagram of the electromagnetic interference (EMI) filterpower converter with low common mode noise.

However, if the EMI filter 17 is the common-mode filter shown by FIG. 13, the common-mode EMI filter 17 including: a first common-mode filtering inductor $L_{Cm1}$, coupling between the first phase terminal Ua and the first filtering capacitor $C_{x1}$; a second common-mode filtering inductor $L_{CM2}$, coupling between the second phase terminal Ub and the second filtering capacitor $C_{x2}$; a third common-mode filtering inductor $L_{CM3}$, coupling between the third phase terminal Uc and the third filtering capacitor $C_{x3}$; a first common-mode filtering capacitor $C_{Y1}$, coupling between the third common-mode filtering inductor $L_{CM3}$ and the ground terminal GND; a second common-mode filtering capacitor $C_{Y2}$, coupling between the second common-mode filtering inductor $L_{CM2}$ and the ground terminal GND; and a third common-mode filtering capacitor $C_{Y3}$, coupling between the first common-mode filtering inductor $L_{CM1}$ and the ground terminal GND.

Figure 14:
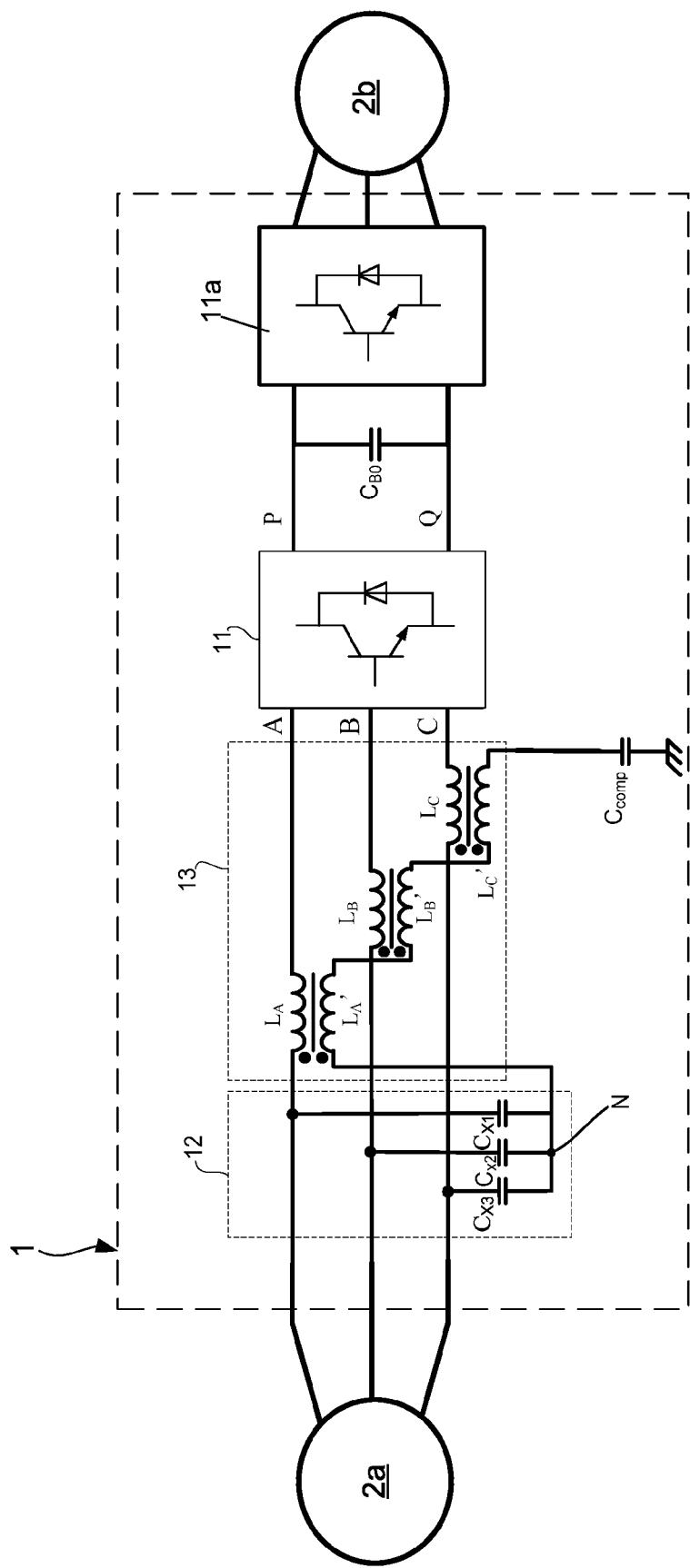
FIG. 14 shows an applied diagram of the power converter with low common mode noise.

Thus, through above descriptions, the circuit diagram and related technology features of the power converter with low common mode noise proposed by the present invention have been introduced completely and clearly. Next, the application fields of this power converting apparatus 1 will be continuously introduced in following paragraphs. Please refer to FIG. 14, which illustrate a first applied circuit diagram of the power converter with low common mode noise. As shown in FIG. 14, by way of connecting the first DC terminal P and the second DC terminal Q to a second power converting unit 11a, coupling the second power converting unit 11a to a motor 2b, and connecting the three AC terminals (A, B, C) to an external electrical grid 2a, the power converting apparatus 1 of the present invention can be applied in the field of motor drive systems or wind power generation systems; wherein the second power converting unit IIa is an AC-DC rectifying unit or a DC-AC inverter unit.

Figure 15:
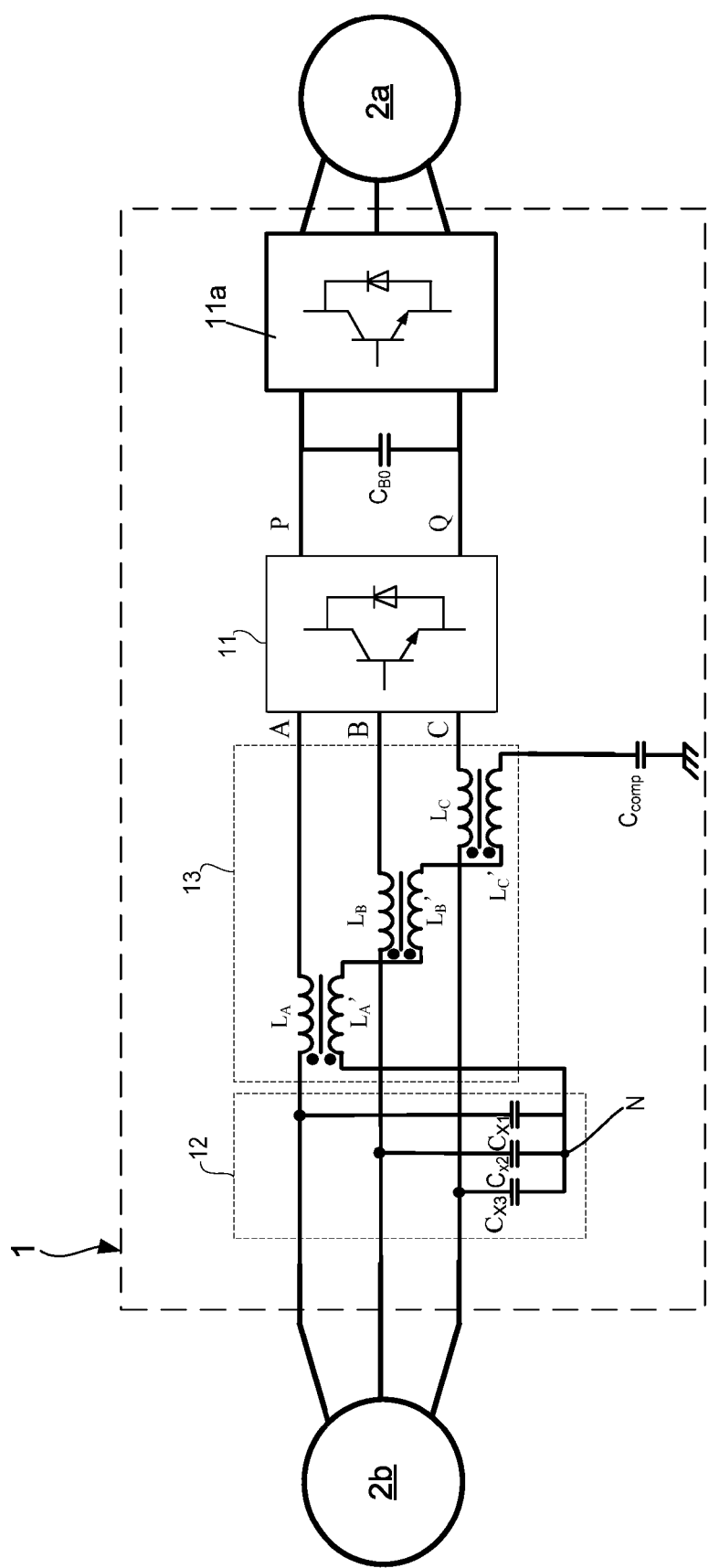
FIG. 15 shows an applied diagram of the power converter with low common mode noise.

Moreover, please refer to FIG. 15, which illustrate a second applied circuit diagram of the power converter with low common mode noise. As shown in FIG. 15, through connecting the first DC terminal P and the second DC terminal Q to one second power converting unit 11a, coupling the second power converting unit 11a to one external electrical grid 2a, and connecting the three AC terminals (A, B, C) to one motor 2b, the power converting apparatus 1 of the present invention can be applied to the motor side of the motor drive system or the wind power generation system; wherein the second power converting unit 11a is a DC-AC invert or an AC-DC rectifying unit.

Figure 16:
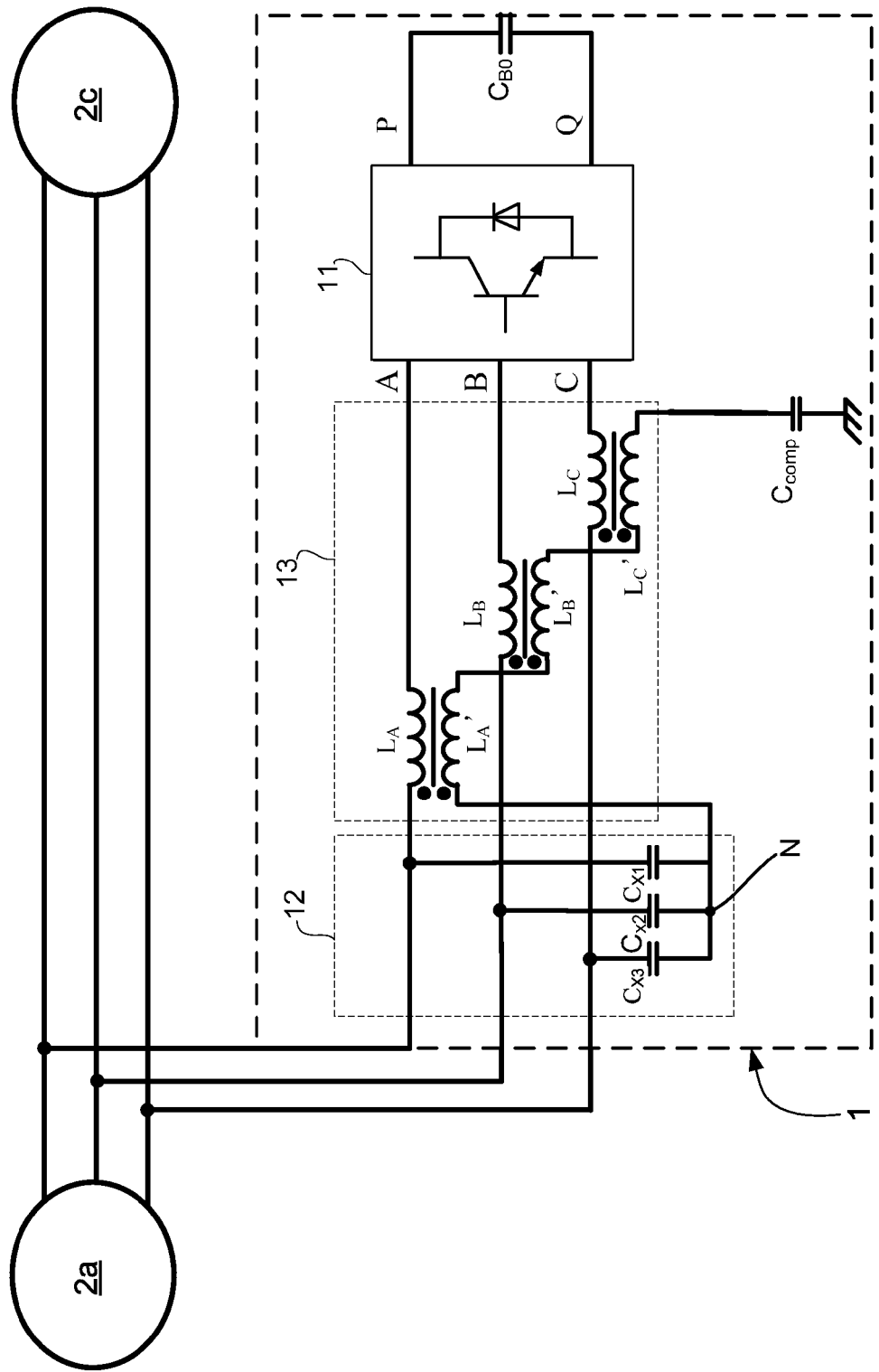
FIG. 16 shows an applied diagram of the power converter with low common mode noise.
Figure 17:
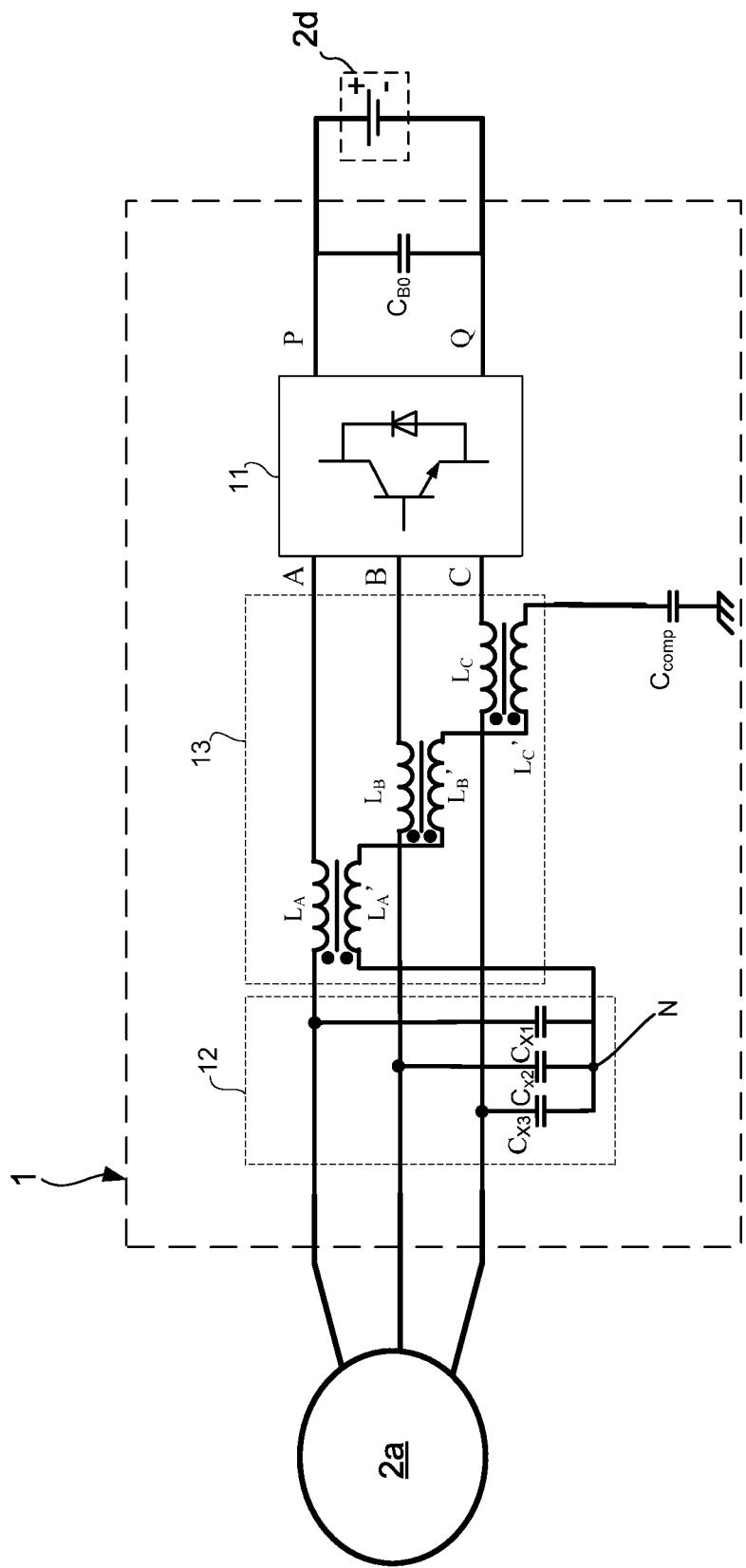
FIG. 17 shows an applied diagram of the power converter with low common mode noise.

Continuously, please refer to FIG. 16, there is shown a third applied circuit diagram of the power converter with low common mode noise. As shown in FIG. 16, because the first DC terminal P and the second DC terminal Q of the power converting unit 11 dose not connect with any electrical apparatus, one capacitor unit of common DC bus $C_{B0}$ is connected between the first DC terminal P and the second DC terminal Q; and oppositely, the three AC terminals (A, B, C) are simultaneously coupled to one electrical grid 2a and one nonlinear load 2c. Finally, please refer to FIG. 17, which illustrate a circuit diagram of the power converter with low common mode noise. In FIG. 17, the first DC terminal P and the second DC terminal Q of the power converting unit 11 are connected to a battery 2d, and the three AC terminals (A, B, C) are coupled to one electrical grid 2a.

Therefore, the circuit diagram, technology features and related application fields of one embodiment of the power converter with low common mode noise proposed by the present invention have been introduced completely and clearly; in summary, one embodiment of the present invention includes the advantages of:

(1) In the present invention, a filtering inductor unit 13 including three primary windings ($L_A$, $L_B$, $L_C$) and three auxiliary windings ($L_A'$, $L_B'$, $L_C'$) is used for making the power converting unit 11 couple to three phase terminals of an external electrical apparatus. Moreover, the three auxiliary windings ($L_A'$, $L_B'$, $L_C'$) are further formed a compensation circuit 14 by connecting with the compensation unit 141 such as the compensation capacitor $C_{comp}$, such that the engineer is able to easily and effectively suppress the common mode noise occurring near the resonant frequency $f_0$ of the power converting apparatus 1 through selecting a suitable turns ratio of the primary windings ($L_A$, $L_B$, $L_C$) and the auxiliary windings ($L_A'$, $L_B'$, $L_C'$).

(2) Inheriting to above point (1), because the three auxiliary windings ($L_A'$, $L_B'$, $L_C'$) in the power converting apparatus 1 are used for guiding the common mode current flow into the ground terminal GND, the three auxiliary windings ($L_A'$, $L_B'$, $L_C'$) can be winded up by thin coil wires, so as to effectively reduce the volume and the manufacturing cost of the common mode filter.

The above description is made on embodiments of the present invention. However, the embodiments are not intended to limit scope of the present invention, and all equivalent implementations or alterations within the spirit of the present invention still fall within the scope of the present invention.

What is claimed is:

1. A power converter with low common mode noise, comprising:
   a ground terminal;
   a power converting unit, including a first DC terminal, a second DC terminal, a first AC terminal, a second AC terminal, and a third AC terminal;
   a capacitor unit of common DC bus, coupled to the first DC terminal and the second DC terminal;
   a filtering capacitor unit, comprising a first filtering capacitor, a second filtering capacitor and a third filtering capacitor, wherein one end of the first filtering capacitor, the second filtering capacitor and the third filtering capacitor are respectively coupled to a first phase terminal, a second phase terminal and a third phase terminal, and the other end of the first filtering capacitor, the second filtering capacitor and the third filtering capacitor are coupled to each other for forming a neutral terminal; and
   a filtering inductor unit, comprising:
      a first primary winding, including a first primary winding low-frequency end and a first primary winding high-frequency end, wherein the first primary winding low-frequency end is coupled to the first phase terminal and the first filtering capacitor, and the first primary winding high-frequency end being coupled to the first AC terminal;
      a first auxiliary winding, being magnetic coupled to the first primary winding, and including a first auxiliary winding high-frequency end and a first auxiliary winding low-frequency end coupling to the neutral terminal;
      a second primary winding, including a second primary winding low-frequency end and a second primary winding high-frequency end, wherein the second primary winding low-frequency end is coupled to the second phase terminal and the second filtering capacitor, and the second primary winding high-frequency end being coupled to the second AC terminal;
      a second auxiliary winding, being magnetic coupled to the second primary winding, and including a second auxiliary winding high-frequency end and a second auxiliary winding low-frequency end coupling to the first auxiliary winding high-frequency end;

a third primary winding, including a third primary winding low-frequency end and a third primary winding high-frequency end, wherein the third primary winding low-frequency end is coupled to the third phase terminal and the third filtering capacitor, and the third primary winding high-frequency end being coupled to the third AC terminal; and a third auxiliary winding, being magnetic coupled to the third primary winding, and including a third auxiliary winding low-frequency end coupling to the second auxiliary winding high-frequency end and a third auxiliary winding high-frequency end coupling to the ground terminal.

2. The power converter with low common mode noise of claim 1, further comprising a compensation unit coupling between the third auxiliary winding high-frequency end and the ground terminal.

3. The power converter with low common mode noise of claim 2, wherein the compensation unit is selected from the group including: compensation capacitor, compensation inductor, compensation resistor, and combinations of any two or more members.

4. The power converter with low common mode noise of claim 2, wherein the compensation unit including a series connected compensation capacitor and compensation inductor, and the inductance of the compensation inductor is satisfied with the following mathematical equation: $L_{comp} < 2(M - 3L')$; wherein $L_{comp}$ means the inductance of the compensation inductor, M means a mutual inductance of the aforesaid three primary windings and the aforesaid three auxiliary windings, and L' means a inductance of the aforesaid three auxiliary windings.

5. The power converter with low common mode noise of claim 4, wherein the inductance of the compensation inductor is also satisfied with the following mathematical equation: $L_{comp} = M - 3L'$.

6. The power converter with low common mode noise of claim 1, wherein all the turns ratios between the first primary winding and the first auxiliary winding, the second primary winding and the second auxiliary winding as well as the third primary winding and the third auxiliary winding are ranged from 3:1.3 to 3:0.7.

7. The power converter with low common mode noise of claim 1, wherein each of the turns ratios between the first primary winding and the first auxiliary winding, the second primary winding and the second auxiliary winding as well as the third primary winding and the third auxiliary winding is 3:1.

8. The power converter with low common mode noise of claim 1, wherein the power converting unit is a two-level power converter, a three-level power converter, or a multi-level power converter.

9. The power converter with low common mode noise of claim 1, wherein the first DC terminal and the second DC terminal are coupled to a first electrical apparatus.

10. The power converter with low common mode noise of claim 9, wherein the first electrical apparatus is an electrical grid, a motor or an energy-storing unit.

11. The power converter with low common mode noise of claim 10, further comprising a second power converting unit coupling between the first electrical apparatus and the first DC terminal as well as the second DC terminal.

12. The power converter with low common mode noise of claim 11, wherein the second power converting unit is an AC-DC rectifier or a DC-AC inverter.

13. The power converter with low common mode noise of claim 1, wherein the first phase terminal, the second phase terminal and the third phase terminal are coupled to a second electrical apparatus.

14. The power converter with low common mode noise of claim 13, wherein the second electrical apparatus is an electrical grid or a motor.

15. The power converter with low common mode noise of claim 13, further comprising an electromagnetic interference (EMI) filter coupling between the filtering capacitor unit and the first phase terminal, the second phase terminal as well as the third phase terminal.

16. The power converter with low common mode noise of claim 15, wherein the electromagnetic interference (EMI) filter comprises:

a first EMI filter inductor, coupling between the first phase terminal and the first filtering capacitor;

a second EMI filter inductor, coupling between the second phase terminal and the second filtering capacitor;

a third EMI filter inductor, coupling between the third phase terminal and the third filtering capacitor;

a first EMI filter capacitor, coupling between the first EMI filter inductor and the second EMI filter inductor;

a second EMI filter capacitor, coupling between the second EMI filter inductor and the third EMI filter inductor; and a third EMI filter capacitor, coupling between the first EMI filter inductor and the third EMI filter inductor.

17. The power converter with low common mode noise of claim 15, wherein the electromagnetic interference (EMI) filter comprises:

a first EMI filter inductor, coupling between the first phase terminal and the first filtering capacitor;

a second EMI filter inductor, coupling between the second phase terminal and the second filtering capacitor;

a third EMI filter inductor, coupling between the third phase terminal and the third filtering capacitor;

a first EMI filter capacitor, coupling between the third EMI filter inductor and the ground terminal;

a second EMI filter capacitor, coupling between the second EMI filter inductor and the ground terminal; and a third EMI filter capacitor, coupling between the first EMI filter inductor and the ground terminal.

18. The power converter with low common mode noise of claim 1, wherein the power converting apparatus is a three-phase three-wire power converting apparatus.

* * * * *